Figure 1:
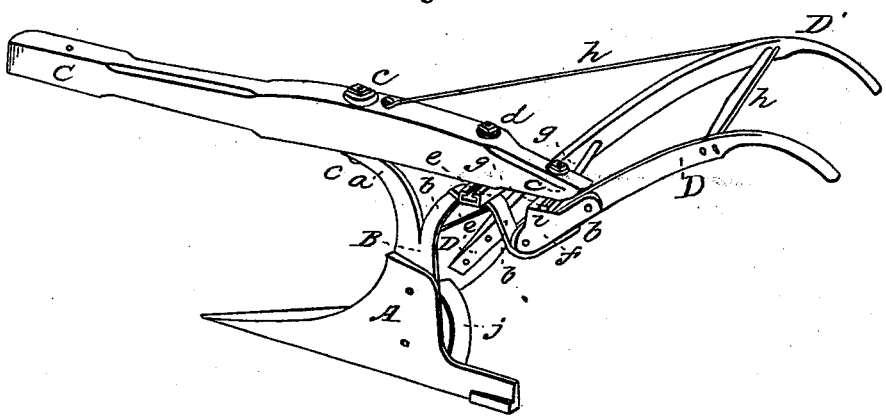

H. B. DURFEE.
Plow.

No. 96,680.

Patented Nov. 9, 1869.

Witnesses:

Inventor:

UNITED STATES PATENT OFFICE.

H. B. DURFEE, OF DECATUR, ILLINOIS.

IMPROVEMENT IN PLOWS.

Specification forming part of Letters Patent No. 96,680, dated November 9, 1869.

*To all whom it may concern:*

Be it known that I, H. B. DURFEE, of Decatur, in the county of Macon and State of Illinois, have invented certain new and useful Improvements in Plows; and I do hereby declare the following to be a full, clear, and exact description of the same, reference being had to the accompanying drawings, making a part of this specification, in which—

Figure 1 represents a perspective view of the plow with the improvements referred to attached.

My invention consists in the use of certain devices or appliances for adjusting the beam longitudinally, so as to throw the plow more toward or from the land, or to adapt it to two or three horses, and thus equalize the draft, or make it more uniform and steady.

To enable others skilled in the art to make and use my invention, I will proceed to describe the same with reference to the drawings.

A represents a plow-iron of any ordinary kind; B, the standard; C, the beam, and D D' the handles of the plow. The standard B is forked, one branch, $a$, curving forward, and the other branch, $b$, curving rearward, and forming at its extreme rear end a seat and support for the handle D.

To the branch $a$ is pivoted by a bolt, $c$, (upon which there are a nut and washer, so as to firmly hold the beam when adjusted,) the beam C, so that it may be adjusted laterally.

On the branch $b$ of the standard there is fastened or wrought a plate, $e$, having an inverted-T-shaped slot through it longitudinally and horizontally, in which slot the head of a screw-bolt, $d$, may move and hold when drawn up, said bolt passing up through the beam.

Upon the lower end of the handle D is fastened a plate, $f$, which has upon it a slotted horizontal ledge, $i$, upon which the heel or rear end of the beam C rests. Through the slot in this ledge $i$ and through the beam there is passed a screw-bolt, $g$.

When the beam is to be adjusted upon the plow, the nuts of the bolts $c\ d\ g$, more particularly those of $d\ g$, are loosened. The point of the beam is then so set in relation to the landside of the plow as to throw the point of the plow into or out of the land, as may be desired. The beam turns upon the bolt $c$ as a pivot or center of motion, and when properly set the nuts are run down, the bolts drawn up tight, and the union between the beam and plow is firm and rigid. A brace-rod, $h$, extends from the beam at or near the bolt $c$ to and through the handle D', and thence to and through the other handle, D, where it may be fastened, either by riveting, or, better, by a nut, so that it may be strained up when necessary. The motion of the beam where this brace-rod is united is so slight (it being close to the pivot-bolt or center of its motion as not) to impair or slacken it as a brace-rod.

A brace, $j$, of curved form reaches from the mold-board to the landside to strengthen them at their rear portions.

Having thus fully described my invention and shown how it is applied, what I claim therein as new, and desire to secure by Letters Patent, is—

In combination with the standard and beam of a plow, the bolts $d\ g$ and slotted plates $e\ i$, so arranged in connection therewith that the beam may be adjusted on the plow, as and for the purpose herein described and represented.

H. B. DURFEE.

Witnesses:
C. M. DURFEE,
WM. E. WINHOLTZ.